United States Patent [19]

Bollinger et al.

[11] 4,312,176

[45] Jan. 26, 1982

[54] MOWER WITH GRASSCATCHER

[75] Inventors: William A. Bollinger; Wilbur B. Hipp, both of Manning, S.C.

[73] Assignee: Sunbeam Corporation, Chicago, Ill.

[21] Appl. No.: 204,129

[22] Filed: Nov. 5, 1980

[51] Int. Cl.³ .......................................... A01D 35/22
[52] U.S. Cl. ....................................... 56/202; 56/16.6
[58] Field of Search ................. 56/202, 203, 204, 205, 56/206, 16.6

[56] References Cited

U.S. PATENT DOCUMENTS

| 2,955,402 | 10/1960 | Strasel | 56/25.4 |
|---|---|---|---|
| 2,955,404 | 10/1960 | Strasel et al. | 56/202 |
| 2,983,095 | 5/1961 | Barth | 56/202 |
| 3,108,420 | 10/1963 | Gercke | 56/205 |
| 3,517,493 | 6/1970 | Kiteley | 56/194 |
| 3,636,686 | 1/1972 | Meyer et al. | 56/320.2 |
| 3,827,220 | 8/1974 | Seidel | 56/320.2 |
| 4,149,362 | 4/1979 | Haffner et al. | 56/202 |
| 4,149,363 | 4/1979 | Woelffer et al. | 56/202 |
| 4,152,884 | 5/1979 | Gandrud et al. | 56/202 |
| 4,203,276 | 5/1980 | Plamper | 56/202 |
| 4,214,424 | 7/1980 | Gobin | 56/202 |

FOREIGN PATENT DOCUMENTS

| 449385 | 1/1971 | Australia . | |
|---|---|---|---|
| 443028 | 8/1971 | Australia . | |
| 452098 | 12/1973 | Australia . | |
| 1127088 | 9/1968 | United Kingdom . | |
| 1176634 | 7/1970 | United Kingdom . | |
| 1210358 | 10/1970 | United Kingdom . | |
| 1242515 | 8/1971 | United Kingdom . | |
| 1278157 | 6/1972 | United Kingdom . | |
| 1429567 | 3/1976 | United Kingdom | 56/202 |

OTHER PUBLICATIONS

Sunbeam Outdoor Company Manual, Model 3548 Lawn Mower, Part #51-3005144-A, 1978.

Primary Examiner—Robert A. Hafer
Attorney, Agent, or Firm—George R. Clark; Neil M. Rose; Allen J. Hoover

[57] ABSTRACT

In a mower equipped with a grasscatcher, the grasscatcher is attached easily by means projecting upwardly from a deck of the mower, means being integral to a rigid portion of the grasscatcher and embracing the projecting means when the grasscatcher is mounted to the deck, and a block which cooperates with an upper lip on the rigid portion so as to restrain the grasscatcher from being detached unintentionally from the deck if the grasscatcher happens to be bumped from beneath, but so as to enable the grasscatcher to be detached easily.

8 Claims, 4 Drawing Figures

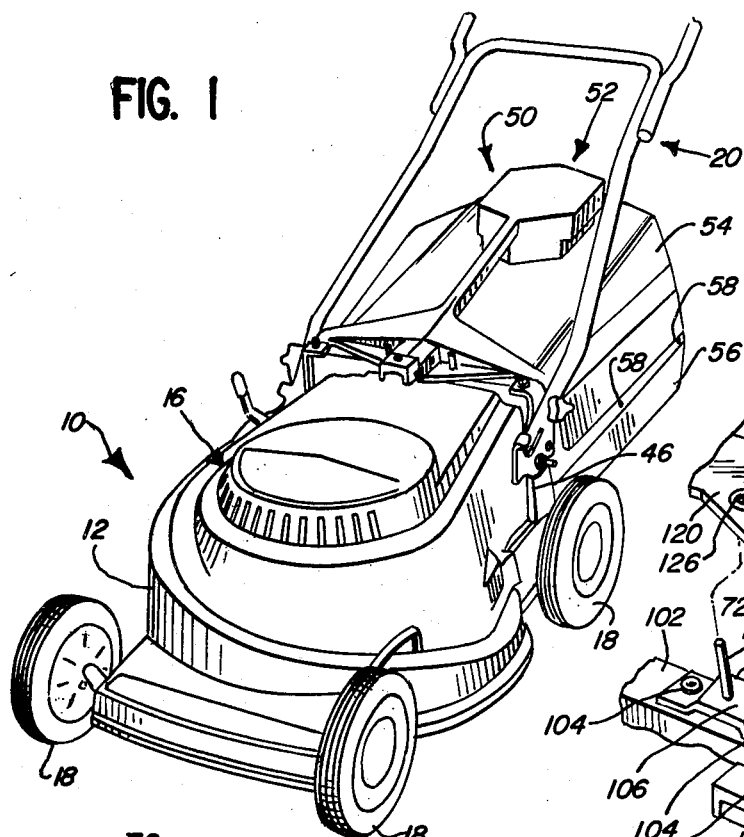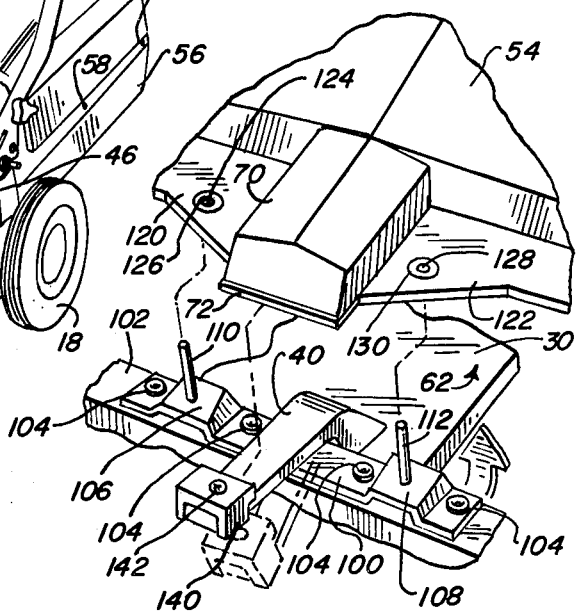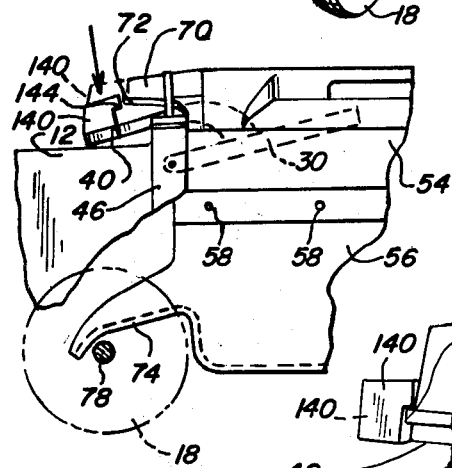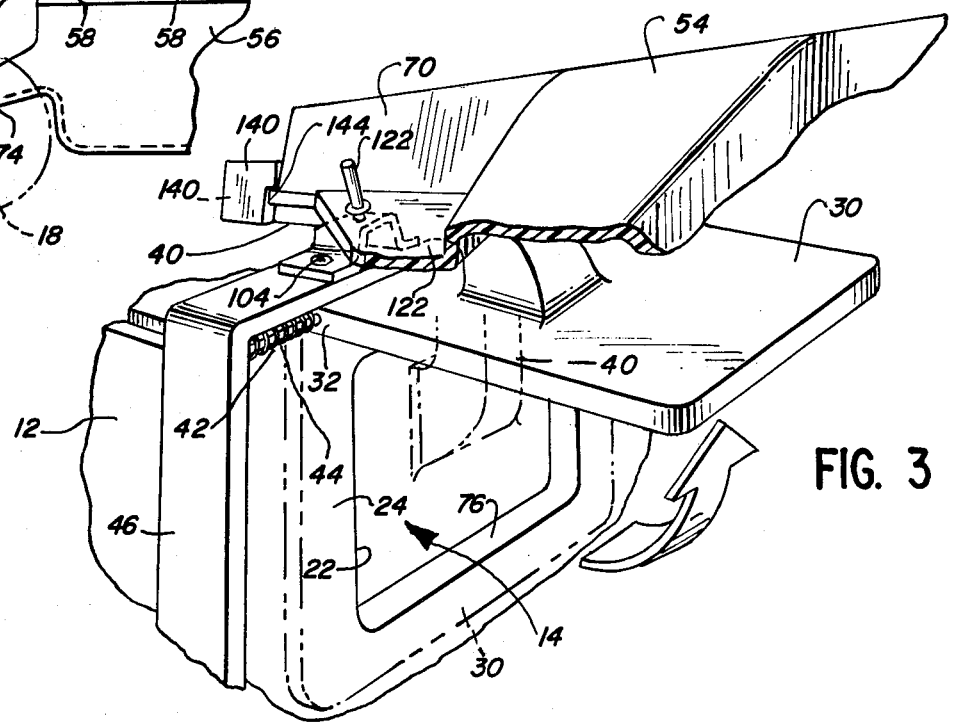

MOWER WITH GRASSCATCHER

BACKGROUND OF THE INVENTION

This invention pertains to an improvement in a mower of a type comprising a grasscatcher, which has a rigid portion including a mouth receiving cuttings when the grasscatcher is mounted to a deck of the mower, for discharge of cuttings rearwardly into the grasscatcher. Herein, all references to directions (rearwardly, upwardly, etc.) assume that the mower is operated on a level surface, by an operator behind the mower.

As exemplified in Australian Patent Specification No. 443,028, British Patent Specification Nos. 1,176,634, 1,210,358, 1,242,515, and 1,278,157, and U.S. Pat. Nos. 2,983,095, 2,955,402, 2,955,404, and 3,517,493, it is known for the grasscatcher to have a rigid shell, which is made of molded plastic material.

As exemplified by several models available from Sunbeam Outdoor Company, Division of Sunbeam Corporation, Manning, S.C. 29102, it is known for the mower to comprise a deck, which includes a cutting chamber opening at a portal for discharge of cuttings rearwardly from the cutting chamber, a door, which has an upper edge where the door is mounted pivotally to the deck near an upper margin of the portal for pivotal movement between a position wherein the door closes the portal, as for operation of the mower without a grasscatcher, and positions wherein the door is pivoted upwardly from the portal, an arm, which is integral to the door for pivotal movement with the door, and which extends upwardly when the door closes the portal, and means biasing the door and the arm toward the position wherein the door closes the portal.

Furthermore, it is known for the grasscatcher to have a rigid portion including a mouth conforming approximately in size and shape to the portal, to be attachable to the deck behind the portal so as to receive cuttings from the cutting chamber through the mouth, and to be detachable from the deck, and for the rigid portion to have an upper lip, which engages the arm so as to cause the door to be pivoted upwardly and rearwardly away from the portal, through the mouth, and into the grasscatcher, and the arm to be pivoted downwardly and forwardly over the deck to a position wherein the arm tends to be held by the upper lip and the biasing means, when the grasscatcher is mounted to the deck.

Various latches and other means have been used to secure the grasscatcher to the deck. Although such means have been generally satisfactory, there has been a need for an improvement enabling the grasscatcher to be attached easily to the deck and detached easily from the deck but to be restrained so as not to become detached unintentionally from the deck, as when the grasscatcher happens to be bumped from beneath, bounced, or lifted, and enabling an operator to ascertain visually whether the grasscatcher is attached effectively.

SUMMARY OF THE INVENTION

As discussed hereinbefore, this invention pertains to an improvement in a mower of a type comprising a deck, which includes a cutting chamber having a portal for discharge of cuttings rearwardly from the cutting chamber, a door, which has an upper edge where the door is mounted pivotally to the deck near an upper margin of the portal for pivotal movement between a position wherein the door closes the portal, as for operation of the mower without a grasscatcher, and positions wherein the door is pivoted upwardly and rearwardly from the portal, an arm, which is integral to the door for pivotal movement with the door, and which extends upwardly when the door closes the portal, and means biasing the door and the arm toward the position wherein the door closes the portal.

As in prior mowers, the rigid portion of the grasscatcher has an upper lip, which engages the arm so as to hold the door in a position wherein the door is pivoted upwardly and rearwardly away from the portal, through the mouth, and into the grasscatcher, and wherein the arm is pivoted downwardly and forwardly over the deck, when the grasscatcher is attached to the deck.

As improved by this invention, the mower comprises means projecting upwardly from a position of the deck near the upper margin of the portal, the projecting means being integral to said portion of the deck, and means embracing the projecting means when the grasscatcher is mounted to the deck, the embracing means being integral to the rigid portion of the grasscatcher near the upper lip, and a block, which is integral to the arm, and which is adapted to cooperate with the upper lip of the grasscatcher when the grasscatcher is attached to the deck so as to restrain the grasscatcher from becoming detached unintentionally from the deck if the grasscatcher happens to be bumped from beneath, but so as to enable the grasscatcher to be detached from the deck by pivotal movement of the arm downwardly and forwardly over the deck beyond the position wherein the arm tends to be held by the upper lip and the biasing means.

Accordingly, the projecting means may comprise parallel pins projecting upwardly from said portion of the deck, and the embracing means may comprise spaced openings, which are provided in the rigid portion of the grasscatcher near the upper lip, and through which the pins project when the grasscatcher is attached to the deck. Preferably, there are a pair of such pins, between which the arm is disposed when the grasscatcher is attached to the deck.

Preferably, the pins project forwardly, as well as upwardly, so as to guide the upper lip into the block if the grasscatcher happens to be bumped from beneath. Preferably, the pins project forwardly about 15° from vertical. Preferably, the upper lip of the grasscatcher has a forward edge, and the block has a groove opening rearwardly and receiving the forward edge when the upper lip is guided into the block.

If the rigid portion or a rigid shell including the rigid portion is made of molded plastic material, a metal grommet may be provided at each of the openings.

Accordingly, the grasscatcher can be attached easily to the deck and can be detached easily from the deck but is restrained so as not to become detached unintentionally from the deck, as when the grasscatcher happens to be bumped from beneath in use of the mower, and an operator can ascertain visually whether the grasscatcher is attached effectively.

BRIEF DESCRIPTION OF THE DRAWINGS

FIG. 1 is a front, upper, perspective view of a mower comprising a grasscatcher attached to a deck and embodying this invention. In FIG. 1, a handle of the mower is broken away.

FIG. 2 is an enlarged, fragmentary, exploded view of cooperative features of the grasscatcher and the deck of the mower. In FIG. 2, the grasscatcher is detached from the deck.

FIG. 3 is an enlarged, fragmentary, rear, upper, perspective view of such features, as such features are shown in FIG. 1 wherein the grasscatcher is attached to the deck.

FIG. 4 is a fragmentary, elevational view of the mower, as taken from one side, wherein pivotal movement of the door and an arm, which is integral to the door, is indicated.

DETAILED DESCRIPTION OF PREFERRED EMBODIMENT

As shown in the drawings, this invention is embodied in a rotary, electric, lawn mower 10, which comprises a deck 12, which includes a cutting chamber 14, an electric motor 16, which is arranged to drive a rotary blade (not shown) within the cutting chamber 14, four wheels 18, three of which are shown, and which are mounted rotatably to the deck 12 so as to allow the mower 10 to move across a lawn, and a handle 20, which is mounted pivotably to the deck 12 so as to enable an operator behind the mower 10 to push the mower 10. The cutting chamber 14 opens at a substantially rectangular portal 22, which is formed in a substantially vertical wall 24 of the deck 12, for discharge of cuttings rearwardly from the cutting chamber 14.

The mower 10 also comprises a door 30, which at its upper edge 32 is mounted pivotally to the deck 12 near an upper margin 32 of the portal 22, for pivotal movement between a position wherein the door 30 closes the portal 22, as for operation of the mower 10 without a grasscatcher, and positions wherein the door 30 is pivoted upwardly and rearwardly from the portal 22. In FIG. 3, the door 30 is shown in phantom lines in the position wherein the door 30 closes the portal 22, and the door 30 is shown in full lines in a position wherein the door 30 is pivoted upwardly and rearwardly from the portal 22.

The mower 10 also comprises an arm 40, which is integral to the door 30 for pivotal movement with the door 30, and which extends upwardly when the door closes the portal 22, and a pair of coiled springs 42, which are piloted about a door hinge pin 44 extending laterally and coaxially from the upper edge 32 of the door 30 into respective sockets (not shown) in a flanged portion 46 of the deck 12, and which are arranged to bias the door 30 and the arm 40 toward the position wherein the door 30 closes the portal 22. In FIG. 3, one of the springs 42 and one end of the door hinge pin 44 are shown. As shown in FIGS. 2 and 3, the springs 42 bias the door 30 and the arm 40 in a sense being opposite to that of wide arrows suggesting pivotal movement of the door 30 away from the position wherein the door closes the portal 22.

As described so far, the mower 10 is similar to prior mowers available from Sunbeam Outdoor Company, supra, as exemplified by the Sunbeam Model 3347 Electric Rotary Lawn Mower, and as exemplified by the Sunbeam Model 3548 Gas Rotary Lawn Mower.

The mower 10 also comprises a grasscatcher 50, which has a rigid shell 52 of molded plastic material, blow-molded polyethylene or equivalent material being preferred. The rigid shell 52 is made in an upper, rigid part 54 and a lower, rigid part 56. Before final assembly, the upper, rigid part 54 and the lower, rigid part 56 may be nested, one within the other, so as to enable the grasscatcher to be shipped in a compact package. In final assembly, the upper, rigid part 54 and the lower, rigid part 56 are fastened together by threaded metal fasteners 58. The grasscatcher 50 is provided with one or more screened openings (not shown) so as to enable air pressure within the grasscatcher 50 to be relieved but so as to retain clippings within the grasscatcher 50.

The rigid shell 52 of the grasscatcher 50 includes a mouth 62 being defined by the upper, rigid part 54 and the lower, rigid part 56 and conforming approximately in size and shape to the portal 22. The grasscatcher 50 is attachable to the deck 12, behind the portal 22, so as to receive cuttings from the cutting chamber 14 through the mouth 62. The grasscatcher 50 is detachable from the deck 12.

The upper, rigid part 54 of the rigid shell 52 of the grasscatcher 50 has an upper lip 70, which has a forward edge 72, and which engages the arm 40 so as to hold the door 30 in a position wherein the door 30 is pivoted upwardly and rearwardly away from the portal 22, through the mouth 62, and into the grasscatcher 50, and wherein the arm 40 is pivoted downwardly and forwardly over the deck 12, when the grasscatcher 50 is attached to the deck 12.

As shown in FIG. 4, the lower rigid part 56 of the rigid shell 52 of the grasscatcher 50 has a lower lip 74, which penetrates the cutting chamber 14, overlies a lower margin 76 (FIG. 3) of the portal 22, and overlies a rear axle 78, so as to guide clippings from the cutting chamber 14 into the grasscatcher 50.

As described so far, the grasscatcher 50 is similar to prior grasscatchers available from Sunbeam Outdoor Company, as exemplified by the grasscatcher for the Sunbeam Model 3347, Electric Rotary Lawn Mower, and as exemplified by the grasscatcher for the Sunbeam Model 3548 Gas Rotary Lawn Mower.

As improved by this invention, the mower 10 also comprises a bracket 100, which is mounted on an upper surface 102 of the flanged portion 46 of the deck 12 by threaded fasteners or rivets 104 so as to be integral to the deck 12, and which has two stepped portions 106, 108. The mower also comprises a pair of parallel pins 110, 112. The pin 110 projects upwardly and forwardly from and is mounted integrally to the stepped portion 106 of the bracket 100. The pin 112 projects upwardly and forwardly from and is mounted integrally to the stepped portion 108 of the bracket 100. The pins 110, 112, project forwardly about 15° from vertical.

The upper, rigid part 54 of the rigid shell 52 of the grasscatcher 50 also has integral gussets 120, 122, which are located respectively on opposite sides of the upper lip 70. The gusset 120 is provided with an opening 124, which embraces the pin 110 when the grasscatcher 50 is attached to the deck 12, and is reinforced at the opening 124 by a metal grommet 126, which fits slidably around the pin 110. The gusset 122 is provided with an opening 128, which embraces the pin 112 when the grasscatcher 50 is attached to the deck 12, and is reinforced at the opening 128 by a metal grommet 130, which fits slidably around the pin 112.

The mower 12 also comprises a block 140, which is fastened to the arm 40 by a screw 142 so as to be integral to the arm 40, and which has a groove 144 opening. As discussed below, the block 140 is manipulated by an operator, whenever the grasscatcher 50 is to be attached to the deck 12, and whenever the grasscatcher 50 is to be detached from the deck 12.

When the grasscatcher 50 is to be attached to the deck 12, the block 140 is moved by an operator forwardly and downwardly (as indicated by an arrow in FIG. 4) between the pins 110, 112, beyond the position wherein the block 140 is shown in full lines in FIG. 3 and in phantom lines in FIG. 4, to a position wherein the block 140 is shown in full lines in FIG. 4, so as to provide sufficient clearance between the block 140 and the forward edge 72 of the upper lip 70 for the grasscatcher 50 to be lowered so as to pass the pins 110, 112, through the grommets 126, 130, until the gussets 120, 122, rest upon the stepped portions 106, 108, of the bracket 100. Thereupon, the grasscatcher 50 is lowered as mentioned above, and the block 140 is released so as to allow the arm 40 to move against the upper lip 70, as the arm 40 and the door 30 are biased by the springs 42 to the position wherein the arm 40 is shown in full lines in FIG. 3. The operator can ascertain visually whether the grasscatcher 50 is attached effectively.

When the grasscatcher 50 is attached to the deck 12, and if the grasscatcher 50 happens to be bumped from beneath, bounced, or lifted, the grasscatcher 50 is guided by the pins 110, 112, forwardly, as well as upwardly, into the block 140, whereupon the groove 144 of the block 140 receives the forward edge 72 of the upper lip 70 so as to restrain the grasscatcher 50, which thus does not become detached unintentionally from the deck 12.

When the grasscatcher 50 is to be detached from the deck 12, the block 140 also is moved by the operator forwardly and downwardly (as indicated by the arrow in FIG. 4) between the pins 110, 112, beyond the position wherein the block 140 is shown in full lines in FIG. 3 and in phantom lines in FIG. 4 to a position wherein the block 140 is shown in full lines in FIG. 4, so as to provide sufficient clearance between the block 140 and the forward edge 72 of the upper lip 70 for the grasscatcher to be lifted away. Thereupon, the block 140 is released so as to allow the arm 40 and the door 30 to return to the position wherein the door 30 closes the portal 22, as the arm 40 and the door 30 are biased by the springs 42.

Hence, the grasscatcher 50 can be attached easily to the deck 12 and can be detached easily from the deck 12 but is restrained so as not to become detached unintentionally from the deck 12, as when the grasscatcher 50 happens to be bumped from beneath in use of the mower 10, and an operator can ascertain visually whether the grasscatcher 50 is attached effectively.

I claim:

1. In a mower of a type comprising
   a deck, which includes a cutting chamber opening at a portal for discharge of cuttings rearwardly from the cutting chamber,
   a door, which has an upper edge where the door is mounted pivotedly to the deck near an upper margin of the portal for pivotal movement between a position wherein the door closes the portal, as for operation of the mower without a grasscatcher, and positions wherein the door is pivoted upwardly and rearwardly from the portal,
   an arm, which is integral to the door for pivotal movement with the door, and which extends upwardly when the door closes the portal,
   means biasing the door and the arm toward the position wherein the door closes the portal, and
   a grasscatcher, which has a rigid portion including a mouth conforming approximately in size and shape to the portal, which is attachable to the deck behind the portal so as to receive cuttings from the cutting chamber through the mouth, and which is detachable from the deck,
   wherein the rigid portion of the grasscatcher has an upper lip, which engages the arm so as to hold the door in a position wherein the door is pivoted upwardly and rearwardly away from the portal, through the mouth, and into the grasscatcher, and wherein the arm is pivoted downwardly and forwardly over the deck, when the grasscatcher is attached to the deck,
   an improvement wherein the mower comprises
   means projecting upwardly from a portion of the deck near the upper margin of the portal, the projecting means being integral to said portion of the deck,
   means embracing the projecting means when the grasscatcher is mounted to the deck, the embracing means being integral to a portion of the grasscatcher near the upper lip, and
   a block, which is integral to the arm, and which is adapted to cooperate with the upper lip when the grasscatcher is attached to the deck so as to restrain the grasscatcher from becoming detached unintentionally from the deck if the grasscatcher happens to be bumped from beneath, but so as to enable the grasscatcher to be detached from the deck by pivotal movement of the arm downwardly and forwardly over the deck beyond the position wherein the arm tends to be held by the upper lip and the biasing means,
   whereby the grasscatcher can be attached easily to the deck and can be detached easily from the deck but is restrained so as not to become detached unintentionally from the deck as when the grasscatcher happens to be bumped from beneath, bounced, or lifted, and whereby an operator can ascertain visually whether the grasscatcher is attached effectively,
   wherein the projecting means comprise parallel pins projecting upwardly from said portion of the deck,
   wherein the embracing means comprise spaced openings, which are provided in the rigid portion of the grasscatcher near the upper lip, and through which the pins project when the grasscatcher is attached to the deck, and
   wherein the pins project forwardly, as well as upwardly, so as to guide the upper lip into the block if the grasscatcher happens to be bumped from beneath, bounced, or lifted.

2. The improvement of claim 1 wherein the pins project forwardly about 15° from vertical.

3. The improvement of claim 2 wherein the upper lip of the grasscatcher has a forward edge, and wherein the block has a groove opening rearwardly and receiving said forward edge when the upper lip is guided into the block.

4. The improvement of claim 1 wherein the rigid portion of the grasscatcher is made of molded plastic material.

5. The improvement of claim 4 wherein a metal grommet is provided at each of the openings.

6. The improvement of claim 3 wherein the rigid portion of the grasscatcher is made of molded plastic material.

7. The improvement of claim 6 wherein a metal grommet is provided at each of the openings.

8. The improvement of any one of claims 1 through 7 wherein the arm is disposed between a pair of the pins when the grasscatcher is attached to the deck.

* * * * *